Jan. 31, 1933.  S. O. C. KUHLEMANN  1,895,999

PARACHUTE DEVICE

Original Filed Feb. 16, 1929

INVENTOR.
S. O. C. Kuhlemann
BY Marks & Clerk
ATTORNEYS.

Patented Jan. 31, 1933

1,895,999

UNITED STATES PATENT OFFICE

STIG OVE CHRISTIAN KUHLEMANN, OF STOCKHOLM, SWEDEN, ASSIGNOR TO CARL H. LUNDHOLM AKTIEBOLAG, OF STOCKHOLM, SWEDEN

PARACHUTE DEVICE

Application filed February 16, 1929, Serial No. 340,587, and in Sweden September 17, 1928. Renewed May 10, 1932.

My present invention relates to parachute devices with or without auxiliary parachutes and especially to containers for such parachute devices.

The principal object of my invention is to provide a container for a parachute device of the class known as flap container which permits a safety and reliable release of the parachute device. To attain this object I provide the parachute container with one or more flaps adapted to close the container and to be opened at one of two opposite edges.

In parachute devices hitherto known having an auxiliary parachute said latter has been packed in the same container as the main parachute in such manner so as to be released simultaneously or nearly simultaneously with said main parachute. However, it has proved that this mode of packing has involved a certain risk of the auxiliary parachute being entangled with the shroud lines of the main parachute causing sometimes the main body portion to be turned inside out.

It is a further object of my invention to pack the auxiliary parachute in such manner in relation to the main parachute that this drawback is eliminated. To this end I prefer to pack the auxiliary parachute in a separate pocket or compartment of the container of the main parachute, and I may also provide means to prevent opening of said main parachute container, before the auxiliary parachute has been filled with air and is at some distance from said main container. It may be observed that this mode of packing of the auxiliary parachute may be applied to flap containers as well as to containers of the class known as sack containers.

The invention will be more fully described with reference to the accompanying drawing in which:—

Figure 1:
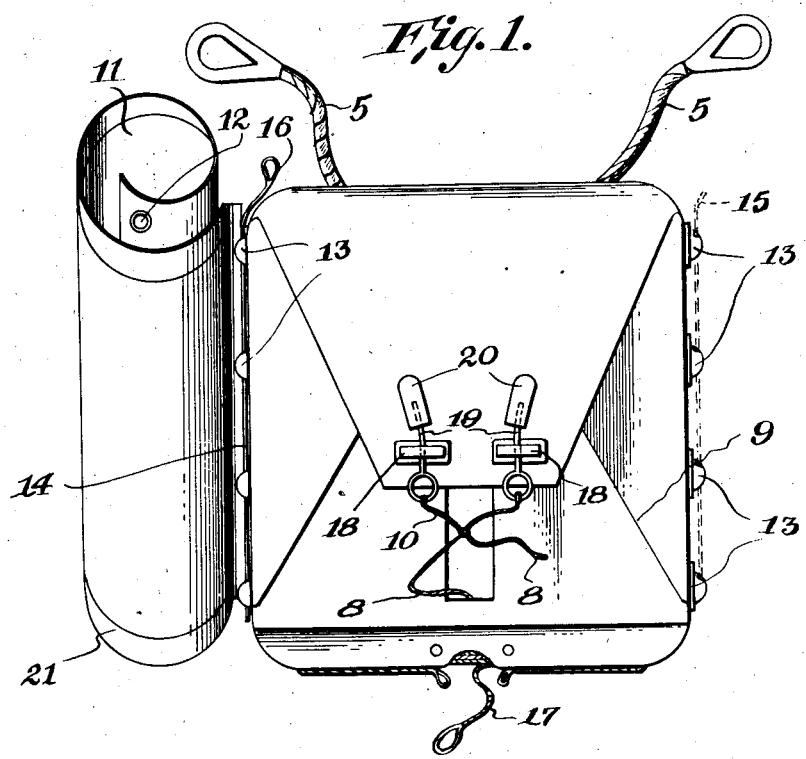
Fig. 1 is a plan view of a container for a parachute device having an auxiliary parachute, a flap for said auxiliary parachute being shown opened at its one edge and the auxiliary parachute being removed.
Figure 2:
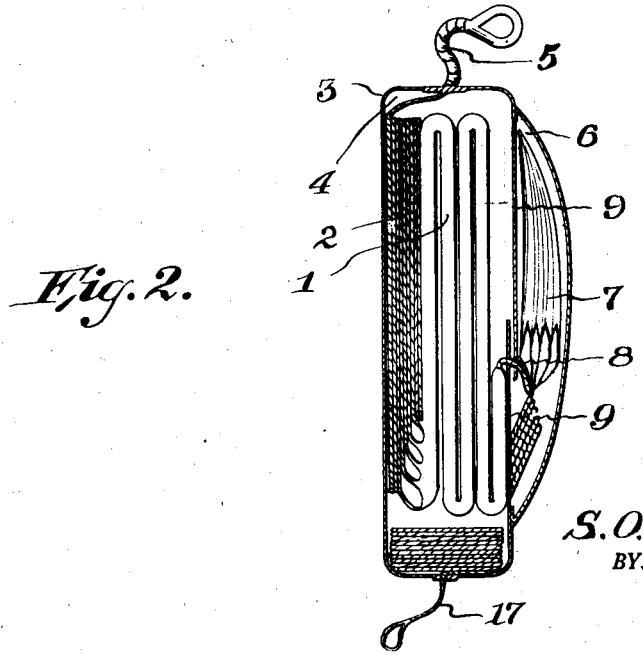
Fig. 2 is a section of the container enclosing the main parachute and the auxiliary parachute, before the flap of the auxiliary parachute has been opened.

1 is the main body portion packed with its shroud lines 2 in a large compartment 4 of the container 3. The shroud lines 2 are connected with the anchor lines 5 which are adapted to be secured to the girth or harness of the aviator. Packed in a separate pocket 6 of the container 3 is an auxiliary parachute 7 connected to the top of the main body portion 1 by means of a line 8 carried through a hole or groove 10 in one of the flaps 9 which separate the auxiliary parachute pocket 6 from the compartment 4 for the main parachute. 11 is the flap of the auxiliary parachute provided at two opposite side edges with holes 12 which together with corresponding knobs 13 secured to the edges of the parachute container as well as with steel wires 14 and 15 carried through holes in said knobs 13 form releasable hinges on which the flap can swing. In Fig. 1 the wire 15 is shown by dotted lines, said wire being in fact already removed in the position of the flap shown in this figure. One of said wires 14 is provided with a grasping ring or the like 16 and adapted to be drawn out, when the parachute device is used for manual release, whereas the other steel wire 15 is at its one end secured to a so called developing line 17 adapted to be secured to the aircraft, when the parachute is used for automatic or static release. The flaps 9 separating the compartment 4 for the main parachute from the pocket for the auxiliary parachute are kept closed by means of suitable fittings 18 secured to one of the flaps 9 and carried through openings in the other flap, a steel pin 19 or the like engaging each fitting 18. The free ends of the pins 19 are preferably inserted into small pockets 20 in the one flap 9. At their other end the pins 19 are connected with the line 8.

The auxiliary parachute flap 11 is preferably provided with elastic means, e. g. elastic bands, springs or the like so arranged as to cause the flap to coil up when released.

Instead of holes 12 and knobs 13 any other suitable fastening means may be used as for instance metal spirals, pipes or the like. Instead of by flaps 9 the compartment 4 for the main parachute may evidently be closed by an arrangement similar to the flap 11.

The operation of my new flap container is as follows:

(a) The parachute device is used for automatic release.

After the jump the line 17 will draw out the steel wire 15 causing a release of the flap 11 at this edge, said flap being coiled up in the direction of the opposite edge. By this the auxiliary parachute is released and develops drawing out the steel pins 19 so that the flaps 9 are released. Then the main parachute is drawn out and develops.

(b) The parachute device is used for manual release.

At a suitable moment after the jump the aviator draws out the steel wire 14 causing a release of the flap 11 at this edge, said flap being coiled up in the direction of the opposite edge. Then the operation will be the same as when the automatic releasing means is used.

It may be observed that the pocket 6 of the auxiliary parachute is first opened causing the development of said auxiliary parachute, whereas the main parachute is still in the closed compartment 4 and consequently partakes in the descending movement of the container. When the auxiliary parachute has been filled with air and the line has been stretched, the flaps 9 closing the compartment 4 are released and the main parachute drawn out and develops.

What I claim is:—

1. In a parachute device, a container having a flap adapted to close the container and to be opened at one of two opposite edges, means being provided to cause the flap to coil up at the one edge when being released at the opposite edge.

2. In a parachute device, a container having a flap adapted to close the container and to be opened at one of two opposite edges, said flap being elastic so as to be coiled up laterally of the container when released.

3. In a parachute device, a container having a flap adapted to close the container and to be opened selectively at each of two opposite edges, automatically operable means to open said flap at one of said edges and manually operable means to open said flap at the opposite edge.

4. In a parachute device, a container having a flap adapted to close the container and to be selectively opened at each of two opposite edges, means comprising a manually operable member to open said flap at one of said edges and means comprising an automatically operable member to open the flap at the opposite edge.

5. In a parachute device, a container having a flap adapted to close the container and to be opened at one of two opposite edges, said opening means comprising a releasable member normally connecting said flap with the container and means combined with the flap and adapted to cause said flap to coil up at the one edge when being released at the opposite edge.

6. In a parachute device having a main parachute and an auxiliary parachute directly connected to the former, a container comprising a large compartment adapted to enclose said main parachute, a small compartment communicating with the large compartment and adapted to enclose said auxiliary parachute and means to close said large compartment and to separate it from said small compartment, said means being controlled by said auxiliary parachute and adapted to be opened, only when the auxiliary parachute has been filled with air and its lines have been stretched.

7. In a parachute device having a main parachute and an auxiliary parachute, a container comprising a large compartment adapted to enclose said main parachute, a separate small compartment adapted to enclose said auxiliary parachute and a flap adapted to close said small compartment and to be opened at one of two opposite edges.

8. In a parachute device having a main parachute and an auxiliary parachute, a container comprising a large compartment adapted to enclose said main parachute, a small compartment adapted to enclose said auxiliary parachute, closing means for said large compartment, said means being controlled by said auxiliary parachute and adapted to be released, only when said auxiliary parachute has been filled with air and its lines have been stretched, and a manually and automatically operable flap adapted to close said small compartment and to be selectively opened at each of two opposite edges.

9. In a parachute device having a main parachute and an auxiliary parachute directly connected to the main parachute, a container comprising a large compartment adapted to enclose said main parachute and a small compartment communicating with the large compartment and adapted to enclose said auxiliary parachute, a flap for separating said compartments from each other and locking means for said flap controlled by said auxiliary parachute and adapted to be opened, only when the auxiliary parachute has been filled with air and its lines have been stretched.

10. A parachute device comprising a container enclosing the parachute, manually operable means and automatically operable means to lock said container, said two locking means being unlockable independent of each other.

STIG OVE CHRISTIAN KUHLEMANN.